US012599131B2

(12) United States Patent
Kawaguchi et al.

(10) Patent No.: US 12,599,131 B2
(45) Date of Patent: Apr. 14, 2026

(54) DISINFECTANT COMPOSITION

(71) Applicant: KAO CORPORATION, Tokyo (JP)

(72) Inventors: Hiroko Kawaguchi, Wakayama (JP);
Yoshiko Kiyohara, Tochigi (JP);
Takanori Saito, Wakayama (JP)

(73) Assignee: KAO CORPORATION, Tokyo (JP)

( * ) Notice: Subject to any disclaimer, the term of this
patent is extended or adjusted under 35
U.S.C. 154(b) by 444 days.

(21) Appl. No.: 18/011,581

(22) PCT Filed: Sep. 29, 2021

(86) PCT No.: PCT/JP2021/035745
§ 371 (c)(1),
(2) Date: Dec. 20, 2022

(87) PCT Pub. No.: WO2022/071351
PCT Pub. Date: Apr. 7, 2022

(65) Prior Publication Data
US 2023/0276799 A1      Sep. 7, 2023

(30) Foreign Application Priority Data

Sep. 30, 2020    (JP) ................................ 2020-164405

(51) Int. Cl.
*A01N 37/06*        (2006.01)
*A01N 41/04*        (2006.01)
*A01P 3/00*         (2006.01)
(52) U.S. Cl.
CPC ............. *A01N 37/06* (2013.01); *A01N 41/04*
(2013.01); *A01P 3/00* (2021.08)
(58) Field of Classification Search
CPC ........ A01N 37/06; A01N 41/04; A01N 37/04;
A01N 37/36; A01N 25/02; A01N 25/30;
A01P 3/00; Y02A 50/30
See application file for complete search history.

(56) References Cited

U.S. PATENT DOCUMENTS

| 2003/0138498 A1 | 7/2003 | Yoshikawa et al. | |
| 2014/0079658 A1* | 3/2014 | Terazaki .............. | A61K 8/4913 |
| | | | 424/70.11 |
| 2015/0335598 A1* | 11/2015 | Buchalova ............. | A61K 45/06 |
| | | | 514/557 |
| 2016/0263062 A1 | 9/2016 | Liebowitz et al. | |

FOREIGN PATENT DOCUMENTS

| JP | H08-53696 A | 2/1996 | |
| JP | 2001288018 A | 10/2001 | |
| JP | 2002053899 A | 2/2002 | |
| JP | 2014076983 A | 5/2014 | |
| JP | 2015178548 A | 10/2015 | |
| JP | 6324781 B2 | 5/2018 | |
| JP | 2020147656 A | 9/2020 | |
| WO | WO-2017209118 A1 * | 12/2017 | .............. D06L 1/02 |

OTHER PUBLICATIONS

WO-2017209118-A1 (English Translation; 2017); Publication year
2017.*
English translation of International Preliminary Report on Patent-
ability and Written Opinion issued Apr. 13, 2023 in PCT/JP2021/
035745, 6 pages.
International Search Report issued Nov. 22, 2021 in PCT/JP2021/
035745 (with English translation), 6 pages.
J. Stapersma et al, "Hydroxy Alkane Sulfonate (HAS), a New
Surfactant Based on Olefins", JAOCS, vol. 69, No. 1, Jan. 1992, pp.
39-43.
Extended European Search Report issued Oct. 22, 2024 in Patent
Application No. 21875651.8, 8 pages.

* cited by examiner

*Primary Examiner* — Snigdha Maewall
(74) *Attorney, Agent, or Firm* — Element IP, PLC

(57)         ABSTRACT
Provided is a disinfectant composition exhibiting high dis-
infecting ability even if containing no disinfecting base
agents that have conventionally been widely used or con-
taining the disinfecting base agents in a reduced amount.
The disinfectant composition contains an internal olefin
sulfonate with 8 or more and 24 or less carbons; one or more
organic acids selected from monocarboxylic acids, hydroxy
acids, and dicarboxylic acids; and water.

12 Claims, No Drawings

DISINFECTANT COMPOSITION

FIELD OF THE INVENTION

The present invention relates to a disinfectant composition.

BACKGROUND OF THE INVENTION

In recent years, regulations on substances having adverse effects on the environment or humans have been tightened. Further, consumers are also becoming more interested in products using reliable and safe substances. Under such circumstances, increased hygiene awareness has led to the use of disinfectant compositions having disinfecting effects. However, there are concerns that many disinfecting base agents included in disinfectant compositions have significant adverse effects on the environment or humans, and that surfactants used together with them are also derived from petrochemical raw materials, and others. Therefore, desired is a disinfectant composition using no disinfecting base agents that have conventionally been widely used or using them in a reduced amount and instead using safe and reliable base agents to exhibit disinfecting performance.

JP-A 2015-178548 discloses a disinfecting cleaning agent composition comprising 0.5 mass % or more and 20 mass % or less of (a) an internal olefin sulfonate with 12 or more and 18 or less carbons, 0.1 mass % or more and 1.0 mass % or less of (b) an oil-soluble disinfectant and 0.25 mass % or more and 7.0 mass % or less of (c) a solvent with a LogP of 2.0 or more and 4.0 or less, and having a pH of 4.7 or more and 7.5 or less at 25° C., thereby having high disinfecting effects even if used for a short period of time.

JP-A 2001-288018 discloses a disinfectant composition for use in automatic washing machines comprising (A) one or more selected from hypochlorite and hypochlorous acid, (B) one or more selected from amphoteric surfactants and cationic surfactants and (C) a pH adjuster, thereby showing high disinfecting effects on spore-forming bacteria or molds.

SUMMARY OF THE INVENTION

The present invention provides a disinfectant composition exhibiting high disinfecting ability even if containing no disinfecting base agents that have conventionally been widely used or containing them in a reduced amount.

The present invention relates to a disinfectant composition containing, (A) an internal olefin sulfonate with 8 or more and 24 or less carbons (hereinafter referred to as component (A)), (B) one or more organic acids selected from monocarboxylic acids, hydroxy acids and dicarboxylic acids (hereinafter referred to as component (B)) and water.

Further, the present invention relates to a disinfectant composition composed of, essentially (A) an internal olefin sulfonate with 8 or more and 24 or less carbons (hereinafter referred to as component (A)), (B) one or more organic acids selected from monocarboxylic acids, hydroxy acids and dicarboxylic acids (hereinafter referred to as component (B)), optionally (C) an organic solvent with a LogP of 0.5 or more and 10 or less (hereinafter referred to as component (C)), optionally (D) a nonionic surfactant (hereinafter referred to as component (D)), and water.

Further, the present invention relates to a method for disinfection including, bringing the disinfectant composition of the present invention as a raw solution or after dilution with water into contact with a target object in which a fungus is present.

According to the present invention, provided is a disinfectant composition exhibiting high disinfecting ability even if containing no disinfecting base agents that have conventionally been widely used or containing them in a reduced amount.

EMBODIMENTS OF THE INVENTION

[Disinfectant Composition]

The disinfectant composition of the present invention, in which an internal olefin sulfonate of component (A) produced from natural raw materials and a specific organic acid of component (B) are used together, can exhibit high disinfecting ability even if containing no disinfecting base agents that have conventionally been widely used or containing them in a reduced amount.

The reason why the disinfectant composition of the present invention exhibits high disinfecting ability is not wholly certain, but inferred to be as follows.

Component (A) adsorbs on and permeates through fungal cell membranes, thereby acting on the cell membranes and membrane proteins and inhibiting fungal membrane function, thereby killing the fungi. On the other hand, the specific organic acid of component (B) adsorbs on and permeates through fungal cell membranes without proton dissociation, and component (B) releases protons within the fungal cell membranes, thereby reducing intracellular pH and inhibiting metabolism, thereby killing the fungi. It is inferred that, when components (A) and (B) are used together, component (A) unexpectedly further promotes the permeation of component (B) through cell membranes, and owing to this synergistic effect of components (A) and (B), high disinfecting effects are exhibited.

<Component (A)>

Component (A) is an internal olefin sulfonate with 8 or more and 24 or less carbons. Component (A) can be obtained by sulfonating an internal olefin.

Component (A) has 8 or more, preferably 12 or more and more preferably 16 or more carbons from the viewpoint of disinfecting ability, and 24 or less, preferably 22 or less, more preferably 20 or less, further preferably 18 or less and furthermore preferably 16 carbons from the viewpoint of enhancing cleaning performance.

Component (A) preferably includes internal olefin sulfonate (IO-1S) with 8 or more and 24 or less carbons in which a sulfonic acid group is present at position 2 or more and 4 or less and internal olefin sulfonate (IO-2S) with 8 or more and 24 or less carbons in which a sulfonic acid group is present at position 5 or more (IO-2S). Further, the mass ratio of (10-1S) to (10-2S), (IO-1S)/(IO-2S), is preferably 0.5 or more and 6.5 or less.

The mass ratio of the content of (10-1S) to the content of (10-2S) in component (A), (IO-1S)/(IO-2S), is preferably 0.5 or more, more preferably 0.6 or more, further preferably 0.7 or more, furthermore preferably 0.8 or more and furthermore preferably 1 or more, and preferably 6.5 or less, more preferably 6 or less, furthermore preferably 5.5 or less, furthermore preferably 5 or less, furthermore preferably 4.5 or less, furthermore preferably 4 or less, furthermore preferably 3.5 or less, furthermore preferably 3 or less, furthermore preferably 2.5 or less, furthermore preferably 2 or less and furthermore preferably 1.5 or less from the viewpoint of attaining both disinfecting ability and cleaning ability.

Note that the content of each compound having a sulfonic acid group at a different position in component (A) can be measured by high-performance liquid chromatography mass spectrometry (hereinafter abbreviated as HPLC-MS). In the present specification, the content of each compound having a sulfonic acid group at a different position is determined as the mass ratio of the compound having a sulfonic acid group at each position to all HAS of component (A) based on HPLC-MS peak areas.

Here, "HAS" refers to hydroxy alkane sulfonates, i.e., a hydroxy species of internal olefin sulfonates, among compounds produced by sulfonation of internal olefin sulfonic acids.

In the present invention, "internal olefin sulfonate (IO-1S) with 8 or more and 24 or less carbons in which a sulfonic acid group is present at position 2 or more and 4 or less" means a sulfonate with 8 or more and 24 or less carbons in which a sulfonic acid group is present at position 2 or more and 4 or less in a HAS species with 8 or more and 24 or less carbons.

Further, "internal olefin sulfonate (IO-2S) with 8 or more and 24 or less carbons in which a sulfonic acid group is present at position 5 or more" means a sulfonate with 8 or more and 24 or less carbons in which a sulfonic acid group is present at position 5 or more in a HAS species with 8 or more and 24 or less carbons.

Note that the internal olefin sulfonate of component (A) is composed by including internal olefin sulfonate (IO-1S) with 8 or more and 24 or less carbons in which a sulfonic acid group is present at position 2 or more and 4 or less and internal olefin sulfonate (IO-2S) with 8 or more and 24 or less carbons in which a sulfonic acid group is present at position 5 or more. The maximum value of the bonding position of a sulfonic acid group in internal olefin sulfonate (IO-2S) is different depending of the number of carbons.

The mass ratio (IO-1S)/(10-2S) for component (A) is based on finally obtained component (A). For example, even if an internal olefin sulfonate is obtained by mixing internal olefin sulfonates having a mass ratio (IO-1S)/(IO-2S) outside the above range, the internal olefin sulfonate is qualified as the internal olefin sulfonate of component (A) if the mass ratio (IO-1S)/(IO-2S) in the composition of the internal olefin sulfonate falls within the above range.

The content of (10-1S) in component (A) is preferably 90 mass % or less, more preferably 85 mass % or less and further preferably 80 mass % or less, and preferably 30 mass % or more and more preferably 40 mass % or more from the viewpoint of attaining both disinfecting ability and cleaning ability.

Examples of a salt in the internal olefin sulfonate of component (A) include one or more selected from alkali metal salts, alkaline earth metal (½ atom) salts, ammonium salts and organic ammonium salts. The alkali metal salts are preferably a sodium salt and a potassium salt, and the organic ammonium salts are preferably alkanol ammonium salts with 1 or more and 6 or less carbons.

Component (A) of the present invention can be obtained by using as a raw material, for example, an internal olefin with 8 or more and 24 or less carbons in which the mass ratio of olefin (10-1) with 8 or more and 24 or less carbons in which a double bond is present at position 1 or more and 3 or less to olefin (10-2) with 8 or more and 24 or less carbons in which a double bond is present at position 5 or more, (IO-1)/(IO-2), is 0.50 or more and 6.5 or less.

Note that the internal olefin used to obtain component (A) is composed of olefin (10-1) with 8 or more and 24 or less carbons in which a double bond is present at position 1 or more and 3 or less, an olefin with 8 or more and 24 or less carbons in which a double bond is present at position 4, and olefin (IO-2) with 8 or more and 24 or less carbons in which a double bond is present at position 5 or more. The maximum value of the position of a double bond in olefin (10-2) is different depending of the number of carbons.

The mass ratio of olefin (10-1) with 8 or more and 24 or less carbons in which a double bond is present at position 1 or more and 3 or less to olefin (10-2) with 8 or more and 24 or less carbons in which a double bond is present at position 5 or more in the internal olefin with 8 or more and 24 or less carbons, (10-1)/(10-2), is preferably 6.5 or less, more preferably 6 or less, further preferably 5.5 or less, furthermore preferably 5 or less, furthermore preferably 4.5 or less, furthermore preferably 3 or less, furthermore preferably 2.5 or less, furthermore preferably 2 or less and furthermore preferably 1.5 or less, and preferably 0.50 or more, more preferably 0.55 or more and further preferably 0.6 or more from the viewpoint of attaining both disinfecting ability and cleaning ability.

Note that the mass ratio (10-1)/(10-2) for the internal olefin used to obtain component (A) may be based on finally obtained component (A). For example, even if an internal olefin sulfonate is obtained by mixing internal olefin sulfonates obtained by using as a raw material an olefin having a mass ratio (10-1)/(10-2) outside the above range, the internal olefin sulfonate can be qualified as the internal olefin sulfonate of component (A) obtained by using as a raw material the predetermined olefin if the mass ratio (10-1)/(10-2) in the composition of the olefin considered to be a raw material olefin falls within the above range.

The olefin used as a raw material for component (A) has 8 or more, preferably 12 or more and more preferably 16 or more carbons from the viewpoint of disinfecting ability, and 22 or less, preferably 20 or less, more preferably 18 or less and further preferably 16 carbons from the viewpoint of enhancing cleaning performance.

The internal olefin used as a raw material for component (A) also includes one containing trace amounts of so-called alfa-olefins (hereinafter also referred to as α-olefins) in which the position of a double bond is present at position 1 in the carbon chain. The content of alfa-olefins in the internal olefin is preferably 10 mass % or less, more preferably 5 mass % or less and further preferably 3 mass % or less, and preferably 0.05 mass % or more and more preferably 0.01 mass % or more from the viewpoints of low-temperature stability, reduced production costs and enhanced productivity.

Sulfonation of internal olefins quantitatively produces B-sultones, and part of the B-sultones changes into y-sultones and olefin sulfonic acids, which are further converted into hydroxy alkane sulfonates and olefin sulfonates during neutralization and hydrolysis processes (for example, J. Am. Oil Chem. Soc. 69, 39 (1992)). Here, hydroxy alkane sulfonates in which a hydroxy group is located internal to the alkane chain, and olefin sulfonates in which a double bond is located internal to the olefin chain are obtained. Further, the obtained product is mainly a mixture of them, and may partially include trace amounts of hydroxy alkane sulfonates having a hydroxy group at the terminal of the carbon chain, or olefin sulfonates having a double bond at the terminal of the carbon chain.

In the present specification, each of these products and a mixture of them are collectively referred to as the internal olefin sulfonate (component (A)). Further, the hydroxy alkane sulfonates are referred to as a hydroxy species of internal olefin sulfonates (HAS), and the olefin sulfonates are referred to as an olefin species of internal olefin sulfonates (hereinafter also referred to as IOS).

Note that the mass ratio of a compound in component (A) can be measured by HPLC-MS. Specifically, the mass ratio can be determined from HPLC-MS peak areas for component (A).

A distribution of double bonds in the raw material internal olefin can be measured, for example, by gas chromatography mass spectrometry (hereinafter abbreviated as GC-MS). Specifically, by precisely separating components with different carbon chain lengths and double bond positions from one another by gas chromatography spectrometry (hereinafter abbreviated as GC) and subjecting each to mass spectrometry (hereinafter abbreviated as MS), the double bond positions can be identified, and the proportion of each can be determined from the GC peak areas. For the content of each olefin having a double bond at a specific position mentioned above, the value determined from GC peak areas is used. Further, when a mixture of olefins with different carbon numbers is used, the position distribution of double bonds is represented by a position distribution of double bonds in olefins with the same carbon number.

Note that, in the present specification, when a mixture of a plurality of internal olefin sulfonates obtained from a plurality of types of raw material olefins with different double bond positions is used, the position distribution of double bonds in the olefin used as a raw material for the internal olefin sulfonate is calculated as a distribution in each olefin with the same carbon number.

<Component (B)>

Component (B) is one or more organic acids selected from monocarboxylic acids, hydroxy acids and dicarboxylic acids.

Suitable as component (B) is an organic acid with an acid dissociation constant (pKa) at 25° C. (hereinafter also referred to as "pKa (25° C.)") of preferably 1 or more, more preferably 1.1 or more, further preferably 1.2 or more, furthermore preferably 1.5 or more, furthermore preferably 2 or more, furthermore preferably 2.5 or more, furthermore preferably 3 or more and furthermore preferably 3.7 or more, and preferably 10 or less, more preferably 9 or less, further preferably 8 or less, furthermore preferably 7 or less, furthermore preferably 6 or less, furthermore preferably 5.5 or less and furthermore preferably 5 or less from the viewpoint of disinfecting ability.

When the pH of the disinfectant composition of the present invention is acidic, component (B) having a pKa value falling within the above range is preferable because it has an increased amount of non-acid dissociation molecules, permeates through the inside of cells more easily, and makes acid dissociation more likely to occur within the fungal cells, thereby showing high disinfecting ability.

The pKa (25° C.) of component (B) of the present invention represents the pKa (25° C.) of the compound of component (B) at a concentration of 0.1 mol/L when water is used as a solvent.

For "acid dissociation constant (pKa)," pKa at 25° C. described in "Handbook of Chemistry, basic edition, revised 5th edition edited by the Chemical Society of Japan" (Feb. 20, 2004, published by MARUZEN CO., LTD., pp. II-334 to II-343) or on Chemicalize (https://chemicalize.com/welcome) can be used.

Suitable as component (B) is an organic acid whose solubility in water at a pH of 7 (hereinafter also referred to as "solubility (pH=7)") is preferably 0.0001 mg/mL or more, more preferably 0.0002 mg/mL or more, further preferably 0.0003 mg/mL or more, furthermore preferably 0.001 mg/mL or more, furthermore preferably 0.01 mg/mL or more, furthermore preferably 0.1 mg/mL or more, furthermore preferably 1 mg/mL or more, furthermore preferably 10 mg/mL or more, furthermore preferably 100 mg/mL or more, furthermore preferably 500 mg/mL or more, furthermore preferably 1000 mg/mL or more, furthermore preferably 5000 mg/mL or more and furthermore preferably 10000 mg/mL or more, and preferably 200000 mg/mL or less, more preferably 190000 mg/mL or less, further preferably 180000 mg/mL or less, furthermore preferably 150000 mg/mL or less, furthermore preferably 100000 mg/mL or less and furthermore preferably 70000 mg/mL or less as it needs to be dissolved in a solvent in order to act on fungi to exhibit disinfecting ability.

For easy penetration of component (B) of the present invention through the inside of fungal cells, component (B) having a solubility (pH=7) falling within the above range is preferable.

For "solubility (pH=7)" in the present invention, solubility described on "Chemicalize (https://chemicalize.com/welcome)" can be used.

Suitable as component (B) is an organic acid with preferably 1 or more, and preferably 24 or less, more preferably 22 or less, further preferably 20 or less, furthermore preferably 18 or less, furthermore preferably 16 or less, furthermore preferably 14 or less, furthermore preferably 12 or less, furthermore preferably 10 or less and furthermore preferably 8 or less carbons from the viewpoint of water-solubility or disinfecting ability.

Suitable as component (B) is an organic acid with a molecular weight of preferably 30 or more, more preferably 35 or more, further preferably 40 or more, furthermore preferably 60 or more and furthermore preferably 80 or more, and preferably 500 or less, more preferably 490 or less, further preferably 480 or less, furthermore preferably 400 or less, furthermore preferably 350 or less, furthermore preferably 300 or less, furthermore preferably 250 or less and furthermore preferably 200 or less from the viewpoint of water-solubility or disinfecting ability.

The monocarboxylic acids have preferably 1 or more and more preferably 6 or more, and preferably 20 or less, more preferably 18 or less, further preferably 16 or less, furthermore preferably 14 or less, furthermore preferably 12 or less, furthermore preferably 10 or less and furthermore preferably 8 or less carbons from the viewpoints of water-solubility, disinfecting ability and odors.

Examples of the monocarboxylic acids include one or more selected from caprylic acid (pKa 4.89, solubility 144 mg/mL, 8 carbons, molecular weight 144), sorbic acid (pka 4.8, solubility 299 mg/mL, 6 carbons, molecular weight 112), caproic acid (pKa 4.6, solubility 452 mg/mL, 6 carbons, molecular weight 116), propionic acid (pKa 4.62, solubility 12445 mg/mL, 3 carbons, molecular weight 74), formic acid (pKa 3.54, solubility 40766 mg/mL, 1 carbon, molecular weight 46), acetic acid (pka 4.57, solubility 25786 mg/mL, 2 carbons, molecular weight 60), benzoic acid (pKa 4.08, solubility 430 mg/mL, 7 carbons, molecular weight 122), capric acid (pKa 4.95, solubility 5.535 mg/mL, 10 carbons, molecular weight 172), lauric acid (pKa 4.95, solubility 0.5744 mg/mL, 12 carbons, molecular weight 200), 2-hexyldecanoic acid (pka 5.12, solubility 0.0051 mg/mL, 16 carbons, molecular weight 256) and 2-octyldecanoic acid (pKa 4.98, solubility 0.0007 mg/mL, 18 carbons, molecular weight 284).

Note that the monocarboxylic acids exclude compounds that fall into hydroxy acids.

In parentheses, the pKa (25° C.), solubility (pH=7), carbon number and molecular weight of each compound are shown in this order.

The hydroxy acids have preferably 2 or more, and preferably 20 or less, more preferably 18 or less, further preferably 16 or less, furthermore preferably 14 or less, furthermore preferably 12 or less, furthermore preferably 10 or less and furthermore preferably 8 or less carbons from the viewpoint of water-solubility or disinfecting ability.

Examples of the hydroxy acids include one or more selected from salicylic acid (pKa 2.97, solubility 1173 mg/mL, 7 carbons, molecular weight 138), lactic acid (pKa 3.8, solubility 21268 mg/mL, 3 carbons, molecular weight 90), tartaric acid (pKa 2.87, solubility 37131 mg/mL, 4 carbons, molecular weight 150), malic acid (pKa 3.23, 4.77, 4.5, solubility 38685 mg/mL, 4 carbons, molecular weight 134), glycolic acid (pKa 3.65, solubility 43556 mg/mL, 2 carbons, molecular weight 76), gluconic acid (pKa 3.86, solubility 126141 mg/mL, 6 carbons, molecular weight 196), citric acid (pKa 2.9, 4.35, 5.69, solubility 47847 mg/mL, 6 carbons, molecular weight 192), gallic acid (pKa 3.94, solubility 8626 mg/mL, 7 carbons, molecular weight 170) and glyceric acid (pka 3.42, solubility 59557 mg/mL, 3 carbons, molecular weight 106). In parentheses, the pKa (25° C.), solubility (pH=7), carbon number and molecular weight of each compound are shown in this order.

The dicarboxylic acids have preferably 2 or more and more preferably 4 or more, and preferably 20 or less, more preferably 18 or less, further preferably 16 or less, furthermore preferably 14 or less, furthermore preferably 12 or less, furthermore preferably 10 or less and furthermore preferably 8 or less carbons from the viewpoint of water-solubility or disinfecting ability.

Examples of the dicarboxylic acids include one or more selected from maleic acid (pKa 1.83, solubility 6642 mg/mL, 4 carbons, molecular weight 116), fumaric acid (pKa 3, solubility 6642 mg/mL, 4 carbons, molecular weight 116), oxalic acid (pKa 1.27, solubility 21764 mg/mL, 2 carbons, molecular weight 90), malonic acid (pKa 2.43, solubility 38974 mg/mL, 3 carbons, molecular weight 104), succinic acid (pKa 4.2, solubility 69013 mg/mL, 4 carbons, molecular weight 118), glutaric acid (pKa 3.76, solubility 37852 mg/mL, 5 carbons, molecular weight 132), adipic acid (pKa 4.3, solubility 30673 mg/mL, 6 carbons, molecular weight 146), azelaic acid (pKa 4.15, solubility 689 mg/mL, 9 carbons, molecular weight 188), sebacic acid (pKa 4.6, solubility 222 mg/mL, 10 carbons, molecular weight 202) and glutamic acid (pKa 1.88, solubility 38611 mg/mL, 5 carbons, molecular weight 147).

Note that the dicarboxylic acids exclude compounds that fall into hydroxy acids.

In parentheses, the pKa (25° C.), solubility (pH=7), carbon number and molecular weight of each compound are shown in this order.

Component (B) is preferably one or more organic acids selected from caprylic acid, sorbic acid, caproic acid, propionic acid, formic acid, acetic acid, benzoic acid, salicylic acid, lactic acid, tartaric acid, malic acid, glycolic acid, gluconic acid, citric acid, maleic acid, fumaric acid, oxalic acid, adipic acid, glutamic acid, succinic acid, sebacic acid and azelaic acid, more preferably one or more organic acids selected from caprylic acid, caproic acid, sorbic acid, lactic acid, glycolic acid, gluconic acid, fumaric acid, succinic acid, adipic acid, sebacic acid and azelaic acid, further preferably one or more organic acids selected from sorbic acid, lactic acid, succinic acid, glycolic acid, gluconic acid, sebacic acid and adipic acid, and furthermore preferably one or more organic acids selected from lactic acid, succinic acid, gluconic acid and adipic acid from the viewpoints of water-solubility, disinfecting ability and odors.

<Composition and Others>

The disinfectant composition of the present invention contains component (A) in an amount of preferably 0.001 mass % or more, more preferably 0.002 mass % or more, further preferably 0.01 mass % or more, furthermore preferably 0.1 mass % or more, furthermore preferably 0.5 mass % or more and furthermore preferably 1 mass % or more, and preferably 50 mass % or less, more preferably 30 mass % or less, further preferably 15 mass % or less, furthermore preferably 10 mass % or less, furthermore preferably 5 mass % or less and furthermore preferably 3 mass % or less from the viewpoint of enhancing disinfecting ability or cleaning performance.

The disinfectant composition of the present invention contains component (B) in an amount of preferably 0.0001 mass % or more, more preferably 0.0002 mass % or more, further preferably 0.001 mass % or more, furthermore preferably 0.01 mass % or more, furthermore preferably 0.1 mass % or more and furthermore preferably 0.2 mass % or more, and preferably 10 mass % or less, more preferably 5 mass % or less, further preferably 3 mass % or less, furthermore preferably 2 mass % or less, furthermore preferably 1.5 mass % or less and furthermore preferably 1 mass % or less from the viewpoint of disinfecting ability or water-solubility.

The total content of components (A) and (B) in the disinfectant composition of the present invention is preferably 0.01 mass % or more, more preferably 0.02 mass % or more, further preferably 0.1 mass % or more, furthermore preferably 0.5 mass % or more and furthermore preferably 1 mass % or more from the viewpoint of cleaning ability, and preferably 20 mass % or less, more preferably 15 mass % or less, further preferably 10 mass % or less and furthermore preferably 5 mass % or less from the viewpoint of low-temperature stability.

The mass ratio between the content of component (A) and the content of component (B) in the disinfectant composition of the present invention, (B)/(A), is preferably 0.001 or more, more preferably 0.01 or more, further preferably 0.02 or more, furthermore preferably 0.05 or more, furthermore preferably 0.08 or more and furthermore preferably 0.1 or more, and preferably 4 or less, more preferably 3 or less, further preferably 2 or less, furthermore preferably 1.5 or less, furthermore preferably 1 or less, furthermore preferably 0.8 or less and furthermore preferably 0.5 or less from the viewpoint of disinfecting ability.

The disinfectant composition of the present invention preferably further contains an organic solvent with a LogP of 0.5 or more and 10 or less as component (C) from the viewpoint of enhancing disinfecting ability.

The LogP of component (C) is 0.5 or more, preferably 0.8 or more and more preferably 1 or more, and 10 or less, preferably 7 or less, more preferably 5 or less, further preferably 4 or less and furthermore preferably 3 or less from the viewpoint of disinfecting ability.

In the present invention, for the LogP, calculation values determined by using ChemProperty of ChemBioDraw Ultra ver. 14.0 by PerkinElmer, Inc. are used. Note that the larger the logP value is, the higher the hydrophobicity is.

The organic solvent of component (C) has preferably 2 or more, more preferably 4 or more and further preferably 6 or more, and preferably 30 or less, more preferably 28 or less, further preferably 24 or less, furthermore preferably 20 or less, furthermore preferably 16 or less, furthermore preferably 14 or less and furthermore preferably 12 or less carbons from the viewpoints of water-solubility and disinfecting ability.

Examples of component (C) include one or more organic solvents selected from hexyl glycerin (LogP 1.11, 9 carbons), octanediol (LogP 1.68, 8 carbons), hexanol (LogP 1.8, 6 carbons), 2-ethylhexyl glyceryl ether (LogP 1.93, 11 carbons), heptanol (LogP 2.22, 7 carbons), decanediol (LogP 2.52, 10 carbons), octanol (LogP 2.64, 8 carbons), glyceryl caprylate (LogP 1.64, 11 carbons), 3-isodecyloxy-1, 2-propanediol (LogP 2.69, 13 carbons), hexyldecanol (LogP 5.96, 16 carbons), octyldodecanol (LogP 7.63, 20 carbons) and decyltetradecanol (LogP 9.3, 24 carbons), and one or more organic solvents selected from octanediol, 2-ethylhexyl glyceryl ether, glyceryl caprylate, 1-octanol, 3-isodecyloxy-1, 2-propanediol and hexyldecanol are preferable and one or more organic solvents selected from octanediol, 2-ethylhexyl glyceryl ether, glyceryl caprylate and 1-octanol are more preferable from the viewpoints of water-solubility and disinfecting ability.

When the disinfectant composition of the present invention contains component (C), it contains component (C) in an amount of preferably 0.0001 mass % or more, more preferably 0.0002 mass % or more, further preferably 0.001 mass % or more, furthermore preferably 0.01 mass % or more, furthermore preferably 0.1 mass % or more, furthermore preferably 0.5 mass % or more and furthermore preferably 1 mass % or more, and preferably 50 mass % or less, more preferably 30 mass % or less, further preferably 20 mass % or less, furthermore preferably 15 mass % or less, furthermore preferably 10 mass % or less, furthermore preferably 5 mass % or less, furthermore preferably 3 mass % or less and furthermore preferably 2 mass % or less from the viewpoint of disinfecting ability.

When the disinfectant composition of the present invention contains component (C), the mass ratio between the content of component (A) and the content of component (C) in the composition, (C)/(A), is preferably 0.001 or more, more preferably 0.01 or more, further preferably 0.05 or more, furthermore preferably 0.1 or more and furthermore preferably 0.3 or more, and preferably 10 or less, more preferably 5 or less, further preferably 3 or less, furthermore preferably 1 or less and furthermore preferably 0.7 or less from the viewpoint of enhancing disinfecting ability.

The disinfectant composition of the present invention preferably further contains a nonionic surfactant as component (D) from the viewpoint of enhancing cleaning performance.

Examples of the nonionic surfactant of component (D) include polyoxyalkylene alkyl ethers having an alkyl group with 8 or more and 18 or less carbons, polyoxyalkylene alkenyl ethers having an alkenyl group with 8 or more and 18 or less carbons, polyoxyalkylene sorbitan fatty acid esters having a fatty acid group with 8 or more and 18 or less carbons, alkyl glycosides having an alkyl group with 8 or more and 18 or less carbons, alkyl polyglycosides having an alkyl group with 8 or more and 18 or less carbons, sucrose fatty acid esters having a fatty acid group with 8 or more and 18 or less carbons, alkyl polyglyceryl ethers having an alkyl group with 8 or more and 18 or less carbons and the like, and one or two or more of them can be used.

Component (D) is preferably one or more selected from alkyl glycosides having an alkyl group with 8 or more and 18 or less carbons, alkyl polyglycosides having an alkyl group with 8 or more and 18 or less carbons, polyoxyalkylene alkyl ethers having an alkyl group with 8 or more and 18 or less carbons and polyoxyalkylene alkenyl ethers having an alkenyl group with 8 or more and 18 or less carbons and more preferably one or more selected from compounds represented by the following general formula (D1) and compounds represented by the following general formula (D2) from the viewpoint of attaining both cleaning performance and disinfecting performance.

A compound represented by the following general formula (D1) is suitable as component (D):

$$R^{1d}(OR^{2d})_x G_y \qquad (D1)$$

wherein $R^{1d}$ represents a straight-chain or branched-chain alkyl group with 8 or more and 18 or less carbons, $R^{2d}$ represents an alkylene group with 2 or more and 4 or less carbons, G represents a residue derived from a sugar with 5 or 6 carbons, x represents numbers whose average value is 0 or more and 5 or less, and y represents numbers whose average value is 1 or more and 3 or less.

$R^{1d}$ in the general formula (D1) is a straight-chain or branched-chain alkyl group and preferably a straight-chain alkyl group with 8 or more and preferably 10 or more, and 18 or less, preferably 16 or less and more preferably 14 or less carbons from the viewpoint of attaining both cleaning performance and disinfecting performance. Further, the alkylene group represented by $R^{2d}$ preferably has 2 carbons from the viewpoint of attaining both cleaning performance and disinfecting performance. Further, the structure of the residue derived from a sugar with 5 or 6 carbons represented by G is determined by a monosaccharide or a di-or higher saccharide used. Examples of G include residues derived from monosaccharides such as glucose, galactose, xylose, mannose, lyxose, arabinose and fructose or mixtures of them or the like, and include residues derived from di-or higher saccharides such as maltose, xylobiose, isomaltose, cellobiose, gentibiose, lactose, sucrose, nigerose, tulanose, raffinose, gentianose and menditose or mixtures of them or the like. Among them, preferable raw materials are glucose and fructose in the monosaccharides, and maltose and sucrose in the di- or higher saccharides.

x in the general formula (D1) is the average number of added moles of $OR^{2d}$, and is preferably 0 or more, and preferably 5 or less, more preferably 3 or less and further preferably 1 or less, and may be 0.

When the average value of y in the general formula (D1) is more than 1, in other words, when the hydrophilic group is a sugar chain of a di- or higher saccharide, the types of bond found in the sugar chain can include 1-2, 1-3, 1-4, or 1-6 bond or α-, β-pyranoside bond or furanoside bond and any mixtures which are mixtures of these types of bond.

The average value of y in the general formula (D1) is 1 or more, and 3 or less, preferably 2 or less and more preferably 1.5 or less. This value for y (average degree of condensation of sugar) is measured by 1H-NMR. See JP-A H8-53696, page 6, column 10, line 26 to page 7, column 11, line 15 for a specific measurement method.

Component (D) is preferably a compound represented by the following formula (D2):

$$R^{3d}-O-[(C_2H_4O)_s(C_3H_6O)_t]-H \qquad (D2)$$

wherein $R^{3d}$ is a straight-chain or branched-chain alkyl group with 8 or more and 18 or less carbons or a straight-chain or branched-chain alkenyl group with 8 or more and 18 or less carbons; and s and t are average numbers of added moles, and s is a number of 1 or more and 50 or less and t is a number of 0 or more and 5 or less, and $(C_2H_4O)$ and $(C_3H_6O)$ may be random polymers or block polymers.

$R^{3d}$ in the general formula (D2) has 8 or more and preferably 10 or more, and 18 or less, preferably 16 or less and more preferably 14 or less carbons from the viewpoint of attaining both cleaning performance and disinfecting performance. $R^{3d}$ is a straight-chain or branched-chain alkyl group or a straight-chain or branched-chain alkenyl group and preferably a straight-chain or branched-chain alkyl group.

s in the general formula (D2) is 1 or more, preferably 2 or more and further preferably 3 or more, and 50 or less, preferably 40 or less, more preferably 30 or less, further preferably 28 or less and furthermore preferably 24 or less from the viewpoint of attaining both cleaning performance and disinfecting performance.

t in the general formula (D2) is 0 or more, and 5 or less, preferably 3 or less and more preferably 2 or less, and may be 0 from the viewpoint of attaining both cleaning performance and disinfecting performance.

When the disinfectant composition of the present invention contains component (D), it contains component (D) in an amount of preferably 0.001 mass % or more, more preferably 0.002 mass % or more, further preferably 0.01 mass % or more, furthermore preferably 0.05 mass % or more, furthermore preferably 0.1 mass % or more and furthermore preferably 0.5 mass % or more, and preferably 50 mass % or less, more preferably 30 mass % or less, further preferably 10 mass % or less, furthermore preferably 5 mass % or less, furthermore preferably 3 mass % or less, furthermore preferably 1.5 mass % or less, furthermore preferably 1 mass % or less and furthermore preferably 0.8 mass % or less from the viewpoint of attaining both cleaning performance and disinfecting performance.

When the disinfectant composition of the present invention contains component (D), the mass ratio of the content of component (A) to the content of component (D) in the composition, (A)/(D), is preferably 0.1 or more, more preferably 0.5 or more, further preferably 1 or more, furthermore preferably 2 or more and furthermore preferably 3 or more, and preferably 10 or less, more preferably 8 or less and further preferably 5 or less from the viewpoint of attaining both cleaning performance and disinfecting performance.

From the viewpoint of considering human safety and the environment, it is preferable that the disinfectant composition of the present invention be free of disinfecting base agents, and it is more preferable that the composition be substantially free of, in particular, disinfecting base agents other than components (A) and (B).

In other words, the present invention provides a disinfectant composition composed of, essentially component (A), component (B), optionally component (C), optionally component (D), and water.

Here, "essentially" in the context of the disinfectant composition of the present invention means that the composition may contain components other than components (A), (B), (C) and (D) and water in a range that the action or effects of the present invention are not affected, but it does not contain components that affect the action or effects of the present invention, for example, a disinfecting base agent other than components (A) and (B).

Examples of the disinfecting base agent include one or more selected from triclosan, isopropylmethylphenol, parachlorometaxylenol, chlorphenesin, piroctone olamine, benzethonium chloride, benzalkonium chloride, cetylpyridinium chloride, chlorhexidine and polylysine.

The content of a disinfecting base agent other than components (A) and (B) in the disinfectant composition of the present invention is preferably 20 mass % or less, more preferably 1 mass % or less, further preferably 0.1 mass % or less and furthermore preferably 0.01 mass % or less from the viewpoint of enhancing disinfecting ability while considering human safety and the environment.

The disinfectant composition of the present invention can be optionally formulated with polymers, fragrances, colorants, antiseptics, antioxidants or the like (excluding components (A) to (D)) in a range that the action or effects of the present invention are not affected and in order to increase added values of products.

The disinfectant composition of the present invention contains water. In other words, the balance other than components (A) to (D) and the optional components is water. The disinfectant composition of the present invention contains water in an amount of preferably 20 mass % or more, more preferably 30 mass % or more, further preferably 40 mass % or more and furthermore preferably 50 mass % or more, and preferably 99 mass % or less and more preferably 98 mass % or less. Ion exchange water, sterilized ion exchange water or the like is preferably used as the water.

The pH of the disinfectant composition of the present invention at 20° C. is preferably 1 or more, more preferably 2 or more and further preferably 3 or more, and preferably 7 or less, more preferably 6.5 or less, further preferably 6 or less, furthermore preferably 5.5 or less, furthermore preferably 5 or less and furthermore preferably 4.5 or less from the viewpoint of disinfecting ability or corrosiveness of humans or surfaces to be cleaned.

The disinfectant composition of the present invention can be favorably used for hard surfaces. Examples of the hard surfaces include bathrooms, bathtubs, washbowls, tiles, lavatories, wash basins, mirrors, kitchen sinks, counter tops, plumbing fixtures, furniture, home appliances or the like.

The disinfectant composition of the present invention can be favorably used for textile products. Examples of the textile products include clothing, towels, bedding, textile products for bedding (sheets, pillowcases or the like) and others. Washable textile products other than these can also be targeted.

The disinfectant composition of the present invention can be favorably used for cleansing skin. The disinfectant composition is used, for example, as any of hand finger cleansers such as hand soap or the like, body shampoos and hair shampoos.

Examples of a fungus targeted by the disinfectant composition of the present invention include yeasts represented by the genus *Saccharomyces*, the genus *Rhodotorula*, the genus *Pichia* and the genus *Candida*, molds represented by the genus *Cladosporium*, the genus *Phoma* and the genus *Exophiala*, gram-negative bacteria including food poisoning bacteria such as bacteria of the genus *Escherichia* such as *Escherichia coli* or the like, bacteria of the genus *Pseudomonas* such as *Pseudomonas aeruginosa, Pseudomonas putida* or the like, bacteria of the genus *Serratia* such as *Serratia marcescens* or the like, bacteria of the genus *Burkholderia* such as *Burkholderia cepacia* or the like, bacteria of the genus *Klebsiella* such as *Klebsiella pneumoniae, Klebsiella oxytoca* or the like, bacteria of the genus *Enterobacter* such as *Enterobacter cloacae* or the like, bacteria of the genus *Alcaligenes* such as *Alcaligenes faecalis* or the like, bacteria of the genus *Providencia* such as *Providencia rettgeri* or the like, bacteria of the genus *Methylobacterium*, bacteria of the genus *Salmonella* and others, and gram-positive bacteria represented by bacteria of the genus *Staphylococcus* such as *Staphylococcus aureus, Staphylococcus saprophyticus* or the like and bacteria of the genus *Enterococcus* such as *Enterococcus faecalis* or the like. Among these, the disinfectant composition of the present invention shows excellent disinfecting effects particularly on *Escherichia coli* and *Staphylococcus aureus.*

[Method for Disinfection]

The present invention provides a method for disinfection including, bringing the disinfectant composition of the present invention as a raw solution or as a treatment liquid diluted with water into contact with a target object in which a fungus is present. The matters stated in the disinfectant composition of the present invention can be appropriately applied to the method for disinfection of the present invention.

In the method for disinfection of the present invention, the disinfectant composition of the present invention is brought into contact with the target object in which a fungus is present. Specifically, preferable examples include a method for disinfection including, bringing the disinfectant composition as a raw solution into contact with the target object in which a fungus is present, or bringing a treatment liquid prepared by diluting the disinfectant composition with water (hereinafter also referred to as the treatment liquid of the present invention) into contact with the target object in which a fungus is present.

In the preparation of the treatment liquid of the present invention, the water used to dilute the disinfectant composition of the present invention is generally assumed to be water containing hardness components such as tap water. The hardness of the water used for dilution is preferably 20° dH or less and more preferably 10° dH or less, and 0° dH or more from the viewpoint of exhibiting disinfecting ability.

The treatment liquid of the present invention contains component (A) in an amount of preferably 0.0003 mass % or more, more preferably 0.0005 mass % or more, further preferably 0.003 mass % or more, furthermore preferably 0.03 mass % or more, furthermore preferably 0.2 mass % or more and furthermore preferably 0.3 mass % or more, and preferably 15 mass % or less, more preferably 10 mass % or less, further preferably 5 mass % or less, furthermore preferably 3 mass % or less, furthermore preferably 1.5 mass % or less and furthermore preferably 1 mass % or less from the viewpoint of attaining both cleaning performance and disinfecting performance.

The treatment liquid of the present invention contains component (B) in an amount of preferably 0.00003 mass % or more, more preferably 0.00006 mass % or more, further preferably 0.0003 mass % or more, furthermore preferably 0.003 mass % or more, furthermore preferably 0.03 mass % or more and furthermore preferably 0.06 mass % or more, and preferably 3 mass % or less, more preferably 1.5 mass % or less, further preferably 1 mass % or less and furthermore preferably 0.5 mass % or less from the viewpoint of disinfecting performance.

The treatment liquid of the present invention optionally contains component (C) in an amount of preferably 0.00003 mass % or more, more preferably 0.00006 mass % or more, further preferably 0.0003 mass % or more, furthermore preferably 0.003 mass % or more, furthermore preferably 0.03 mass % or more, furthermore preferably 0.15 mass % or more and furthermore preferably 0.3 mass % or more, and preferably 15 mass % or less, more preferably 10 mass % or less, further preferably 5 mass % or less, furthermore preferably 4 mass % or less, furthermore preferably 3 mass& or less, furthermore preferably 2 mass % or less, furthermore preferably 1 mass % or less and furthermore preferably 0.5 mass % or less from the viewpoint of disinfecting performance.

The treatment liquid of the present invention optionally contains component (D) in an amount of preferably 0.0003 mass % or more, more preferably 0.0006 mass % or more, further preferably 0.003 mass % or more, furthermore preferably 0.0015 mass % or more, furthermore preferably 0.03 mass % or more and furthermore preferably 0.15 mass % or more, and preferably 15 mass % or less, more preferably 10 mass % or less, further preferably 3 mass % or less, furthermore preferably 1.5 mass % or less, furthermore preferably 1 mass or less, furthermore preferably 0.5 mass % or less, furthermore preferably 0.3 mass % or less and furthermore preferably 0.2 mass % or less from the viewpoint of attaining both cleaning performance and disinfecting performance.

The content of a disinfecting base agent other than components (A) and (B) in the treatment liquid of the present invention is preferably 6 mass % or less, more preferably 0.3 mass % or less, further preferably 0.03 mass % or less and furthermore preferably 0.003 mass % or less from the viewpoint of enhancing disinfecting ability while considering human safety and the environment. In the treatment liquid of the present invention, the mass ratios (B)/(A), (C)/(A) and (A)/(D) fall within the same ranges as stated in the disinfectant composition of the present invention.

In the method for disinfection of the present invention, it is preferable that the disinfectant composition of the present invention or the treatment liquid of the present invention be brought into contact with, and further applied or sprayed to, the target object at a ratio of preferably 0.1 g or more, more preferably 0.2 g or more and further preferably 1 g or more, and preferably 50 g or less, more preferably 20 g or less and further preferably 10 g or less relative to an area of 100 cm$^2$ of the target object.

In the method for disinfection of the present invention, after brought into contact with the target object, the disinfectant composition of the present invention or the treatment liquid of the present invention is left for preferably 30 seconds or more, more preferably 60 seconds or more and further preferably 3 minutes or more, and preferably 60 minutes or less, more preferably 50 minutes or less and further preferably 30 minutes or less from the viewpoint of enhancing disinfecting effects. In this case, the point of time when the composition or the treatment liquid first comes into contact with the target object may be the beginning of leaving.

Note that the temperature at which the composition or the treatment liquid is left may be a room temperature, and examples include 10° C. or more and 30° C. or less.

In the method for disinfection of the present invention, the contact may be made by immersing the target object in which a fungus is present in the disinfectant composition or the treatment liquid of the present invention, but it is preferably made by a method of spraying or applying the disinfectant composition or the treatment liquid of the present invention to the target object in which a fungus is present from the viewpoint of enhancing disinfecting effects in an efficient manner.

A method for bringing the disinfectant composition or the treatment liquid of the present invention into contact with the target object in which a fungus is present is preferably spraying or applying, and preferably a method of spraying in liquid droplet form or applying in foam form. Specifically, a spray means is used. In other words, it is preferable to use a disinfectant article made of a bottle equipped with a sprayer and filled with the disinfectant composition or the treatment liquid of the present invention. The present invention provides a spray bottle-contained disinfectant article made of a bottle equipped with a sprayer and filled with the disinfectant composition or the treatment liquid of the present invention.

In the spray bottle-contained disinfectant article of the present invention, examples of the bottle equipped with a sprayer and filled with the disinfectant composition or the treatment liquid of the present invention include manual spraying devices using no propellants such as trigger-type spray bottles, pumping-type spray bottles or the like, aerosol sprays using propellants, and others. The bottle equipped with a sprayer is preferably a trigger-type spray capable of spraying or applying the content in liquid droplet form or foam form, and more preferably a trigger-type spray equipped with a mechanism for spraying the content in liquid droplet form, or a trigger-type spray equipped with a mechanism for forming foam (foam forming mechanism).

The method for disinfection of the present invention is directed to the target object in which a fungus is present, and it is preferably directed to a hard surface, a textile product or skin and more preferably directed to a hard surface.

Examples of the hard surface, textile product or skin targeted by the method for disinfection of the present invention include those listed in the disinfectant composition of the present invention. Examples of a fungus targeted by the method for disinfection of the present invention include those listed in the disinfectant composition of the present invention. Among these, the method for disinfection shows excellent disinfecting effects on *Escherichia coli* and *Staphylococcus aureus*, and preferably on *Escherichia coli*.

Preferable aspects of the disinfectant composition of the present invention are described below.

One aspect of the present invention is a disinfectant composition containing, (A) an internal olefin sulfonate with 16 or more and 18 or less carbons, (B) one or more organic acids selected from monocarboxylic acids, hydroxy acids and dicarboxylic acids, the organic acids having an acid dissociation constant of 3.7 or more and 9 or less at 25° C., and water, wherein a mass ratio between the content of component (A) and the content of component (B), (B)/(A), is 0.05 or more and 1 or less.

Further, another aspect of the present invention is a disinfectant composition containing, (A) an internal olefin sulfonate with 16 or more and 18 or less carbons, (B) one or more organic acids selected from monocarboxylic acids, hydroxy acids and dicarboxylic acids, the organic acids having an acid dissociation constant of 3.7 or more and 9 or less at 25° C., and water, wherein the composition has a pH of 3 or more and 5 or less at 20° C.

Further, another aspect of the present invention is a disinfectant composition containing, (A) an internal olefin sulfonate with 16 or more and 18 or less carbons, (B) one or more organic acids selected from monocarboxylic acids, hydroxy acids and dicarboxylic acids, the organic acids having an acid dissociation constant of 3.7 or more and 9 or less at 25° C., (C) an organic solvent with a LogP of 0.5 or more and 10 or less, and water, wherein a mass ratio between the content of component (A) and the content of component (C), (C)/(A), is 0.3 or more and 0.7 or less.

Further, another aspect of the present invention is a disinfectant composition containing, (A) an internal olefin sulfonate with 16 or more and 18 or less carbons, (B) one or more organic acids selected from monocarboxylic acids, hydroxy acids and dicarboxylic acids, the organic acids having an acid dissociation constant of 3.7 or more and 9 or less at 25° C., (C) an organic solvent with a LogP of 0.5 or more and 10 or less, (D) a nonionic surfactant, and water, wherein a mass ratio of the content of component (A) to the content of component (D), (A)/(D), is 3 or more and 5 or less.

The present invention further discloses the following disinfectant composition and method for disinfection in connection with the above embodiments. The matters stated in the disinfectant composition and the method for disinfection of the present invention can be appropriately applied to these aspects, and vice versa.

<1>
A disinfectant composition containing, (A) an internal olefin sulfonate with 8 or more and 24 or less carbons (hereinafter referred to as component (A)), (B) one or more organic acids selected from monocarboxylic acids, hydroxy acids and dicarboxylic acids (hereinafter referred to as component (B)) and water.

<2>
The disinfectant composition according to <1>, further containing an organic solvent with a LogP of 0.5 or more and 10 or less as component (C).

<3>
The disinfectant composition according to <1> or <2>, further containing a nonionic surfactant as component (D).

<4>
A disinfectant composition composed of, essentially (A) an internal olefin sulfonate with 8 or more and 24 or less carbons (hereinafter referred to as component (A)), (B) one or more organic acids selected from monocarboxylic acids, hydroxy acids and dicarboxylic acids (hereinafter referred to as component (B)), optionally (C) an organic solvent with a LogP of 0.5 or more and 10 or less (hereinafter referred to as component (C)), optionally (D) a nonionic surfactant (hereinafter referred to as component (D)), and water.

<5>
The disinfectant composition according to any of <1> to <4>, wherein component (A) has preferably 12 or more and more preferably 16 or more, and preferably 22 or less, more preferably 20 or less, further preferably 18 or less and furthermore preferably 16 carbons.

<6>
The disinfectant composition according to any of <1> to <5>, wherein component (A) includes internal olefin sulfonate (IO-1S) with 8 or more and 24 or less carbons in which a sulfonic acid group is present at position 2 or more and 4 or less and internal olefin sulfonate (IO-2S) with 8 or more and 24 or less carbons in which a sulfonic acid group is present at position 5 or more, and a mass ratio of (10-1S) to (10-2S), (IO-1S)/(10-2S), is 0.5 or more and 6.5 or less.

<7>
The disinfectant composition according to <6>, wherein the mass ratio of the content of (10-1S) to the content of (10-2S) in component (A), (IO-1S)/(IO-2S), is preferably 0.5 or more, more preferably 0.6 or more, further preferably 0.7 or more, furthermore preferably 0.8 or more and furthermore preferably 1 or more, and preferably 6.5 or less, more preferably 6 or less, furthermore preferably 5.5 or less, furthermore preferably 5 or less, furthermore preferably 4.5 or less, furthermore preferably 4 or less, furthermore preferably 3.5 or less, furthermore preferably 3 or less, furthermore preferably 2.5 or less, furthermore preferably 2 or less and furthermore preferably 1.5 or less.

<8>
The disinfectant composition according to <6> or <7>, wherein the content of (10-1S) in component (A) is preferably 90 mass % or less, more preferably 85 mass % or less and further preferably 80 mass % or less, and preferably 30 mass % or more and more preferably 40 mass % or more.

<9>
The disinfectant composition according to any of <1> to <8>, wherein a salt in component (A) is one or more selected from alkali metal salts, alkaline earth metal (½ atom) salts, ammonium salts and organic ammonium salts, and preferably one or more selected from a sodium salt, a potassium salt and alkanol ammonium salts with 1 or more and 6 or less carbons.

<10>

The disinfectant composition according to any of <1> to <9>, wherein component (A) is an internal olefin sulfonate that can be obtained by using as a raw material an internal olefin with 8 or more and 24 or less carbons in which a mass ratio of olefin (10-1) with 8 or more and 24 or less carbons in which a double bond is present at position 1 or more and 3 or less to olefin (10-2) with 8 or more and 24 or less carbons in which a double bond is present at position 5 or more, (10-1)/(IO-2), is 0.50 or more and 6.5 or less.

<11>

The disinfectant composition according to <10>, wherein in the internal olefin with 8 or more and 24 or less carbons used as a raw material for component (A), the mass ratio of olefin (10-1) with 8 or more and 24 or less carbons in which a double bond is present at position 1 or more and 3 or less to olefin (10-2) with 8 or more and 24 or less carbons in which a double bond is present at position 5 or more, (IO-1)/(10-2), is preferably 6.5 or less, more preferably 6 or less, further preferably 5.5 or less, furthermore preferably 5 or less, furthermore preferably 4.5 or less, furthermore preferably 3 or less, furthermore preferably 2.5 or less, furthermore preferably 2 or less and furthermore preferably 1.5 or less, and preferably 0.50 or more, more preferably 0.55 or more and further preferably 0.6 or more.

<12>

The disinfectant composition according to <10> or <11>, wherein the olefin as a raw material for component (A) has preferably 12 or more and more preferably 16 or more, and preferably 20 or less, more preferably 18 or less and further preferably 16 carbons.

<13>

The disinfectant composition according to any of <10> to <12>, wherein the content of alfa-olefins in the internal olefin used as a raw material for component (A) is preferably 10 mass % or less, more preferably 5 mass? or less and further preferably 3 mass % or less, and preferably 0.05 mass % or more and more preferably 0.01 mass % or more.

<14>

The disinfectant composition according to any of <1> to <13>, wherein component (B) is an organic acid with an acid dissociation constant (pKa) at 25° C. of preferably 1 or more, more preferably 1.1 or more, further preferably 1.2 or more, furthermore preferably 1.5 or more, furthermore preferably 2 or more, furthermore preferably 2.5 or more, furthermore preferably 3 or more and furthermore preferably 3.7 or more, and preferably 10 or less, more preferably 9 or less, further preferably 8 or less, furthermore preferably 7 or less, furthermore preferably 6 or less, furthermore preferably 5.5 or less and furthermore preferably 5 or less.

<15>

The disinfectant composition according to any of <1> to <14>, wherein component (B) is an organic acid whose solubility in water at a pH of 7 is preferably 0.0001 mg/mL or more, more preferably 0.0002 mg/mL or more, further preferably 0.0003 mg/mL or more, furthermore preferably 0.001 mg/mL or more, furthermore preferably 0.01 mg/mL or more, furthermore preferably 0.1 mg/mL or more, furthermore preferably 1 mg/mL or more, furthermore preferably 10 mg/mL or more, furthermore preferably 100 mg/mL or more, furthermore preferably 500 mg/mL or more, furthermore preferably 1000 mg/mL or more, furthermore preferably 5000 mg/mL or more and furthermore preferably 10000 mg/mL or more, and preferably 200000 mg/mL or less, more preferably 190000 mg/mL or less, further preferably 180000 mg/mL or less, furthermore preferably 150000 mg/mL or less, furthermore preferably 100000 mg/mL or less and furthermore preferably 70000 mg/mL or less.

<16>

The disinfectant composition according to any of <1> to <15>, wherein component (B) is an organic acid with preferably 1 or more, and preferably 24 or less, more preferably 22 or less, further preferably 20 or less, furthermore preferably 18 or less, furthermore preferably 16 or less, furthermore preferably 14 or less, furthermore preferably 12 or less, furthermore preferably 10 or less and furthermore preferably 8 or less carbons.

<17>

The disinfectant composition according to any of <1> to <16>, wherein component (B) is an organic acid with a molecular weight of preferably 30 or more, more preferably 35 or more, further preferably 40 or more, furthermore preferably 60 or more and furthermore preferably 80 or more, and preferably 500 or less, more preferably 490 or less, further preferably 480 or less, furthermore preferably 400 or less, furthermore preferably 350 or less, furthermore preferably 300 or less, furthermore preferably 250 or less and furthermore preferably 200 or less.

<18>

The disinfectant composition according to any of <1> to <17>, wherein component (B) is one or more organic acids selected from caprylic acid, sorbic acid, caproic acid, propionic acid, formic acid, acetic acid, benzoic acid, salicylic acid, lactic acid, tartaric acid, malic acid, glycolic acid, gluconic acid, citric acid, maleic acid, fumaric acid, oxalic acid, adipic acid, glutamic acid, succinic acid, sebacic acid and azelaic acid, preferably one or more organic acids selected from caprylic acid, caproic acid, sorbic acid, lactic acid, glycolic acid, gluconic acid, fumaric acid, succinic acid, adipic acid, sebacic acid and azelaic acid, more preferably one or more organic acids selected from sorbic acid, lactic acid, succinic acid, glycolic acid, gluconic acid, sebacic acid and adipic acid, and further preferably one or more organic acids selected from lactic acid, succinic acid, gluconic acid and adipic acid.

<19>

The disinfectant composition according to any of <1> to <18>, containing component (A) in an amount of preferably 0.001 mass % or more, more preferably 0.002 mass % or more, further preferably 0.01 mass % or more, furthermore preferably 0.1 mass % or more, furthermore preferably 0.5 mass % or more and furthermore preferably 1 mass % or more, and preferably 50 mass % or less, more preferably 30 mass % or less, further preferably 15 mass % or less, furthermore preferably 10 mass % or less, furthermore preferably 5 mass % or less and furthermore preferably 3 mass % or less.

<20>

The disinfectant composition according to any of <1> to <19>, containing component (B) in an amount of preferably 0.0001 mass % or more, more preferably 0.0002 mass % or more, further preferably 0.001 mass % or more, furthermore preferably 0.01 mass % or more, furthermore preferably 0.1 mass % or more and furthermore preferably 0.2 mass % or more, and preferably 10 mass % or less, more preferably 5 mass % or less, further preferably 3 mass % or less, furthermore preferably 2 mass % or less, furthermore preferably 1.5 mass % or less and furthermore preferably 1 mass % or less.

<21>

The disinfectant composition according to any of <1> to <20>, wherein a total content of components (A) and (B) is preferably 0.01 mass % or more, more preferably 0.02 mass % or more, further preferably 0.1 mass % or more, furthermore preferably 0.5 mass % or more and furthermore preferably 1 mass % or more, and preferably 20 mass % or less, more preferably 15 mass % or less, further preferably 10 mass % or less and furthermore preferably 5 mass % or less.

<22>

The disinfectant composition according to any of <1> to <21>, wherein a mass ratio between the content of component (A) and the content of component (B), (B)/(A), is preferably 0.001 or more, more preferably 0.01 or more, further preferably 0.02 or more, furthermore preferably 0.05 or more, furthermore preferably 0.08 or more and furthermore preferably 0.1 or more, and preferably 4 or less, more preferably 3 or less, further preferably 2 or less, furthermore preferably 1.5 or less, furthermore preferably 1 or less, furthermore preferably 0.8 or less and furthermore preferably 0.5 or less.

<23>

The disinfectant composition according to any of <2> to <22>, wherein component (C) is an organic solvent with a LogP of preferably 0.8 or more and more preferably 1 or more, and preferably 7 or less, more preferably 5 or less, further preferably 4 or less and furthermore preferably 3 or less.

<24>

The disinfectant composition according to any of <2> to <23>, wherein component (C) is an organic solvent with preferably 2 or more, more preferably 4 or more and further preferably 6 or more, and preferably 30 or less, more preferably 28 or less, further preferably 24 or less, furthermore preferably 20 or less, furthermore preferably 16 or less, furthermore preferably 14 or less and furthermore preferably 12 or less carbons.

<25>

The disinfectant composition according to any of <2> to <24>, wherein component (C) is one or more organic solvents selected from hexyl glycerin, octanediol, hexanol, 2-ethylhexyl glyceryl ether, heptanol, decanediol, octanol, glyceryl caprylate, 3-isodecyloxy-1, 2-propanediol, hexyldecanol, octyldodecanol and decyltetradecanol, preferably one or more organic solvents selected from octanediol, 2-ethylhexyl glyceryl ether, glyceryl caprylate, 1-octanol, 3-isodecyloxy-1, 2-propanediol and hexyldecanol, and more preferably one or more organic solvents selected from octanediol, 2-ethylhexyl glyceryl ether, glyceryl caprylate and 1-octanol.

<26>

The disinfectant composition according to any of <2> to <25>, containing component (C) in an amount of preferably 0.0001 mass % or more, more preferably 0.0002 mass % or more, further preferably 0.001 mass % or more, furthermore preferably 0.01 mass % or more, furthermore preferably 0.1 mass % or more, furthermore preferably 0.5 mass % or more and furthermore preferably 1 mass % or more, and preferably 50 mass % or less, more preferably 30 mass % or less, further preferably 20 mass % or less, furthermore preferably 15 mass % or less, furthermore preferably 10 mass % or less, furthermore preferably 5 mass % or less, furthermore preferably 3 mass % or less and furthermore preferably 2 mass % or less.

<27>

The disinfectant composition according to any of <2> to <26>, wherein a mass ratio between the content of component (A) and the content of component (C), (C)/(A), is preferably 0.001 or more, more preferably 0.01 or more, further preferably 0.05 or more, furthermore preferably 0.1 or more and furthermore preferably 0.3 or more, and preferably 10 or less, more preferably 5 or less, further preferably 3 or less, furthermore preferably 1 or less and furthermore preferably 0.7 or less.

<28>

The disinfectant composition according to any of <3> to <27>, wherein component (D) is one or more selected from polyoxyalkylene alkyl ethers having an alkyl group with 8 or more and 18 or less carbons, polyoxyalkylene alkenyl ethers having an alkenyl group with 8 or more and 18 or less carbons, polyoxyalkylene sorbitan fatty acid esters having a fatty acid group with 8 or more and 18 or less carbons, alkyl glycosides having an alkyl group with 8 or more and 18 or less carbons, alkyl polyglycosides having an alkyl group with 8 or more and 18 or less carbons, sucrose fatty acid esters having a fatty acid group with 8 or more and 18 or less carbons and alkyl polyglyceryl ethers having an alkyl group with 8 or more and 18 or less carbons.

<29>

The disinfectant composition according to any of <3> to <28>, containing a compound represented by the following general formula (D1) as component (D):

$$R^{1d}(OR^{2d})_xG_y \qquad \text{(D1)}$$

wherein $R^{1d}$ represents a straight-chain or branched-chain alkyl group with 8 or more and 18 or less carbons, $R^{2d}$ represents an alkylene group with 2 or more and 4 or less carbons, G represents a residue derived from a sugar with 5 or 6 carbons, x represents numbers whose average value is 0 or more and 5 or less, and y represents numbers whose average value is 1 or more and 3 or less.

<30>

The disinfectant composition according to any of <3> to <29>, containing a compound represented by the following general formula (D2) as component (D):

$$R^{3d}-O-[(C_2H_4O)_s(C_3H_6O)_t]-H \qquad \text{(D2)}$$

wherein $R^{3d}$ is a straight-chain or branched-chain alkyl group with 8 or more and 18 or less carbons or a straight-chain or branched-chain alkenyl group with 8 or more and 18 or less carbons; and s and t are average numbers of added moles, and s is a number of 1 or more and 50 or less and t is a number of 0 or more and 5 or less, and $(C_2H_4O)$ and $(C_3H_6O)$ may be random polymers or block polymers.

<31>

The disinfectant composition according to any of <3> to <30>, containing component (D) in an amount of preferably 0.001 mass % or more, more preferably 0.002 mass& or more, further preferably 0.01 mass % or more, furthermore preferably 0.05 mass % or more, furthermore preferably 0.1 mass % or more and furthermore preferably 0.5 mass % or more, and preferably 50 mass % or less, more preferably 30 mass % or less, further preferably 10 mass % or less, furthermore preferably 5 mass % or less, furthermore preferably 3 mass % or less, furthermore preferably 1.5 mass % or less, furthermore preferably 1 mass % or less and furthermore preferably 0.8 mass % or less.

<32>

The disinfectant composition according to any of <3> to <31>, wherein a mass ratio of the content of component (A) to the content of component (D), (A)/(D), is preferably 0.1 or more, more preferably 0.5 or more, further preferably 1 or more, furthermore preferably 2 or more and furthermore preferably 3 or more, and preferably 10 or less, more preferably 8 or less and further preferably 5 or less.

<33>

The disinfectant composition according to any of <1> to <32>, containing water in an amount of preferably 20 mass % or more, more preferably 30 mass % or more, further preferably 40 mass % or more and furthermore preferably 50 mass % or more, and preferably 99 mass % or less and more preferably 98 mass % or less.

<34>

The disinfectant composition according to any of <1> to <33>, wherein the composition has a pH of preferably 1 or more, more preferably 2 or more and further preferably 3 or more, and preferably 7 or less, more preferably 6.5 or less, further preferably 6 or less, furthermore preferably 5.5 or less, furthermore preferably 5 or less and furthermore preferably 4.5 or less at 20° C.

<35>

The disinfectant composition according to any of <1> to <34>, wherein the composition is for use in hard surfaces and preferably for use in hard surfaces selected from bathrooms, bathtubs, washbowls, tiles, lavatories, wash basins, mirrors, kitchen sinks, counter tops, plumbing fixtures, furniture and home appliances.

<36>

The disinfectant composition according to any of <1> to <34>, wherein the composition is for use in textile products and preferably for use in textile products selected from clothing, towels, bedding and textile products for bedding (sheets, pillowcases or the like).

<37>

The disinfectant composition according to any of <1> to <34>, wherein the composition is for use in cleansing of skin and preferably for use in cleansing of skin selected from hand fingers, body and hair.

<38>

The disinfectant composition according to any of <1> to <37>, wherein a target fungus is a fungus selected from yeasts represented by the genus *Saccharomyces*, the genus *Rhodotorula*, the genus *Pichia* and the genus *Candida*, molds represented by the genus *Cladosporium*, the genus *Phoma* and the genus *Exophiala*, gram-negative bacteria including food poisoning bacteria such as bacteria of the genus *Escherichia* such as *Escherichia coli* or the like, bacteria of the genus *Pseudomonas* such as *Pseudomonas aeruginosa, Pseudomonas putida* or the like, bacteria of the genus *Serratia* such as *Serratia marcescens* or the like, bacteria of the genus *Burkholderia* such as *Burkholderia cepacia* or the like, bacteria of the genus *Klebsiella* such as *Klebsiella pneumoniae, Klebsiella oxytoca* or the like, bacteria of the genus *Enterobacter* such as *Enterobacter cloacae* or the like, bacteria of the genus *Alcaligenes* such as *Alcaligenes faecalis* or the like, bacteria of the genus *Providencia* such as *Providencia rettgeri* or the like, bacteria of the genus *Methylobacterium*, bacteria of the genus *Salmonella* and others, and gram-positive bacteria represented by bacteria of the genus *Staphylococcus* such as *Staphylococcus aureus, Staphylococcus saprophyticus* or the like and bacteria of the genus *Enterococcus* such as *Enterococcus faecalis* or the like, and preferably a fungus selected from *Escherichia coli* and *Staphylococcus aureus*.

<39>

A method for disinfection including, bringing the disinfectant composition according to any of <1> to <38> as a raw solution or as a treatment liquid diluted with water into contact with a target object in which a fungus is present.

<40>

The method for disinfection according to <39>, wherein the hardness of the water used to dilute the disinfectant composition is preferably 20° dH or less and more preferably 10° dH or less, and 0° dH or more.

<41>

The method for disinfection according to <39> or <40>, wherein the treatment liquid contains component (A) in an amount of preferably 0.0003 mass % or more, more preferably 0.0005 mass % or more, further preferably 0.003 mass % or more, furthermore preferably 0.03 mass % or more, furthermore preferably 0.2 mass % or more and furthermore preferably 0.3 mass % or more, and preferably 15 mass % or less, more preferably 10 mass % or less, further preferably 5 mass % or less, furthermore preferably 3 mass % or less, furthermore preferably 1.5 mass % or less and furthermore preferably 1 mass % or less.

<42>

The method for disinfection according to any of <39> to <41>, wherein the treatment liquid contains component (B) in an amount of preferably 0.00003 mass % or more, more preferably 0.00006 mass % or more, further preferably 0.0003 mass % or more, furthermore preferably 0.003 mass % or more, furthermore preferably 0.03 mass % or more and furthermore preferably 0.06 mass % or more, and preferably 3 mass % or less, more preferably 1.5 mass % or less, further preferably 1 mass % or less and furthermore preferably 0.5 mass % or less.

<43>

The method for disinfection according to any of <39> to <42>, wherein the treatment liquid optionally contains component (C) in an amount of preferably 0.00003 mass % or more, more preferably 0.00006 mass % or more, further preferably 0.0003 mass % or more, furthermore preferably 0.003 mass % or more, furthermore preferably 0.03 mass % or more, furthermore preferably 0.15 mass % or more and furthermore preferably 0.3 mass % or more, and preferably 15 mass % or less, more preferably 10 mass % or less, further preferably 5 mass % or less, furthermore preferably 4 mass % or less, furthermore preferably 3 mass % or less, furthermore preferably 2 mass % or less, furthermore preferably 1 mass % or less and furthermore preferably 0.5 mass % or less.

<44>

The method for disinfection according to any of <39> to <43>, wherein the treatment liquid optionally contains component (D) in an amount of preferably 0.0003 mass % or more, more preferably 0.0006 mass % or more, further preferably 0.003 mass % or more, furthermore preferably 0.0015 mass % or more, furthermore preferably 0.03 mass % or more and furthermore preferably 0.15 mass % or more, and preferably 15 mass % or less, more preferably 10 mass % or less, further preferably 3 mass % or less, furthermore preferably 1.5 mass % or less, furthermore preferably 1 mass % or less, furthermore preferably 0.5 mass % or less, furthermore preferably 0.3 mass % or less and furthermore preferably 0.2 mass % or less.

<45>

The method for disinfection according to any of <39> to <44>, wherein the content of a disinfecting base agent other than components (A) and (B) in the treatment liquid is preferably 6 mass % or less, more preferably 0.3 mass % or less, further preferably 0.03 mass % or less and furthermore preferably 0.003 mass % or less.

<46>

The method for disinfection according to any of <39> to <45>, wherein the disinfectant composition or the treatment liquid is brought into contact with the target object at a ratio of preferably 0.1 g or more, more preferably 0.2 g or more and further preferably 1 g or more, and preferably 50 g or less, more preferably 20 g or less and further preferably 10 g or less relative to an area of 100 cm$^2$ of the target object.

<47>

The method for disinfection according to any of <39> to <46>, wherein after brought into contact with the target object, the disinfectant composition or the treatment liquid is left for preferably 30 seconds or more, more preferably 60 seconds or more and further preferably 3 minutes or more, and preferably 60 minutes or less, more preferably 50 minutes or less and further preferably 30 minutes or less.

EXAMPLES

The disinfectant compositions shown in Tables 1 to 3 were prepared by using the following formulation components, and evaluated for the items described later. The results are shown in Tables 1 to 3. For the cleaning agent compositions in Tables 1 and 2, components (A) to (D) were added in the formulation amounts in the tables and dissolved at a room temperature (25° C.). After the formulation, the pH was adjusted to those in Tables 1 to 3 by using sodium hydroxide. Note that the pH was measured by a glass electrode method. Further, the mass percentages of the formulation components in Tables 1 to 3 are all numerical values based on the active components.

<Formulation Component>

Component (A)·

C16IOS-K: an internal olefin sulfonate potassium salt obtained in the following production example 1

C18IOS-K: an internal olefin sulfonate potassium salt obtained in the following production example 2

Production Example of Raw Material for Component (A): Production Example of Internal Olefin with 16 Carbons 7000 g (28.9 mol) of 1-hexadecanol (product name: KALCOL 6098, manufactured by Kao Corporation) and 700 g (10 mass % relative to the raw material alcohol) of γ-alumina (Strem Chemicals, Inc.) as a solid acid catalyst were prepared in a flask with a stirrer, and reacted under stirring for a reaction period of time appropriately adjusted while nitrogen was flowed (at 7000 mL/min.) in the system at 280° C. The obtained crude internal olefin was transferred to a distillation flask and distilled at 148-158° C./0.5 mmHg, thereby obtaining an internal olefin with 16 carbons with an olefin purity of 100%. A double bond distribution in the obtained internal olefin is as follows. In the double bond distribution (mass %) in the internal olefin, position 1/position 2/position 3/position 4/position 5/position 6/position 7/position 8=1.87/21.01/18.20/18.72/14.78/12.15/6.64/6.64.

The double bond distribution in the internal olefin was determined by the aforementioned method.

Note that an internal olefin in which a double bond is present at position 7 and an internal olefin in which a double bond is present at position 8 cannot be structurally distinguished in the olefin with 16 carbons, but they are distinguished when the olefin is sulfonated, so that the value of the amount of the internal olefin in which a double bond is present at position 7 divided by 2 is shown in the field for each of positions 7 and 8 for convenience.

Production Example 1: Production Example of Potassium Internal Olefin Sulfonate with 16 Carbons Using a thin-film sulfonation reactor having an outer jacket, the internal olefin obtained in the above production example of raw material was sulfonated with a sulfur trioxide gas by passing cooling water at 20° C. through the reactor's outer jacket. The molar ratio of SO$_3$ to the internal olefin during the sulfonation reaction was set to 1.09. The obtained sulfonated product was added to an aqueous alkali solution prepared from potassium hydroxide in an amount 1.5 times the theoretic acid value, and neutralized by stirring at 30° C. for 1 hour. The neutralized product was hydrolyzed by heating in an autoclave at 160° C. for 1 hour, thereby obtaining (A-1) a potassium internal olefin sulfonate product. The content proportions (mass percentages) in the internal olefin sulfonate to which a sulfonic acid group is bonded were as follows: position 1/position 2/position 3/position 4/positions 5 to 9=1.69/17.51/15.65/20.28/44.97. (IO-1S)/(IO-2S) was equal to 1.19. In (A-1), the mass of a potassium ion relative to 100 g of the internal olefin sulfonate in acid form was 12.8 g.

Production Example of Raw Material for Component (A): Production Example of Internal Olefin with 18 Carbons 7000 g (25.9 mol) of 1-octadecanol (product name: KALCOL 8098, manufactured by Kao Corporation) and 700 g (10 mass % relative to the raw material alcohol) of γ-alumina (Strem Chemicals, Inc.) as a solid acid catalyst were prepared in a flask with a stirrer, and reacted under stirring for a reaction period of time appropriately adjusted while nitrogen was flowed (at 7000 mL/min.) in the system at 280° C. The obtained crude internal olefin was transferred to a distillation flask and distilled at 148-158° C./0.5 mmHg, thereby obtaining an internal olefin with 18 carbons with an olefin purity of 100%. A double bond distribution in the obtained internal olefin is as follows. In the double bond distribution (mass %) in the internal olefin, position 1/position 2/position 3/position 4/position 5/position 6/position 7/position 8/position 9=1.48/25.99/21.17/17.73/11.86/8.43/5.95/3.70/3.70.

The double bond distribution in the internal olefin was determined by the aforementioned method.

Note that an internal olefin in which a double bond is present at position 8 and an internal olefin in which a double bond is present at position 9 cannot be structurally distinguished in the olefin with 18 carbons, but they are distinguished when the olefin is sulfonated, so that the value of the amount of the internal olefin in which a double bond is present at position 8 divided by 2 is shown in the field for each of positions 8 and 9 for convenience.

Production Example 2: Production Example of Potassium Internal Olefin Sulfonate with 18 Carbons Using a thin-film sulfonation reactor having an outer jacket, the internal olefin obtained in the above production example of raw material was sulfonated with a sulfur trioxide gas by passing cooling water at 20° C. through the reactor's outer jacket. The molar ratio of SO$_3$ to the internal olefin during the sulfonation reaction was set to 1.09. The obtained sulfonated product was added to an aqueous alkali solution prepared from potassium hydroxide in a 1.5 molar times larger amount than the theoretic acid value, and neutralized by stirring at 30° C. for 1 hour. The neutralized product was hydrolyzed by heating in an autoclave at 160° C. for 1 hour, thereby obtaining (A-2) a potassium internal olefin sulfonate product. The content proportions (mass percentages) in the internal olefin sulfonate to which a sulfonic acid group is bonded were as follows: position 1/position 2/position 3/position 4/positions 5 to 9=1.37/ 20.67/17.43/20.95/39.57. (IO-1S)/(IO-2S) was equal to 1.49. In (A-2), the mass of a potassium ion relative to 100 g of the internal olefin sulfonate in acid form was 12.8 g.
Component (A') (Comparative Example Component for Component (A))
ES (3): a sodium polyoxyethylene (3) alkyl ether sulfate, EMAL 327, manufactured by Kao Corporation
Component (B)
Adipic acid: pKa (25° C.) 4.3, solubility (pH=7) 30673 mg/mL, 6 carbons, molecular weight 146, manufactured by FUJIFILM Wako Pure Chemical Corporation
Succinic acid: pKa (25° C.) 4.3, solubility (pH=7) 69013 mg/mL, 4 carbons, molecular weight 118, manufactured by FUJIFILM Wako Pure Chemical Corporation
Azelaic acid: pKa (25° C.) 4.15, solubility (pH=7) 689 mg/mL, 9 carbons, molecular weight 188, manufactured by FUJIFILM Wako Pure Chemical Corporation
Gluconic acid: pKa (25° C.) 3.86, solubility (pH=7) 126141 mg/mL, 6 carbons, molecular weight 196, manufactured by FUJIFILM Wako Pure Chemical Corporation
Sorbic acid: pKa (25° C.) 4.8, solubility (pH=7) 299 mg/mL, 6 carbons, molecular weight 112, manufactured by FUJIFILM Wako Pure Chemical Corporation
Lactic acid: pKa (25° C.) 3.8, solubility (pH=7) 21268 mg/mL, 3 carbons, molecular weight 90, manufactured by FUJIFILM Wako Pure Chemical Corporation Component (B') (comparative component for component (B))
Hydrochloric acid: manufactured by FUJIFILM Wako Pure Chemical Corporation
Component (C)
2-ethylhexyl glyceryl ether: LogP 1.93, 11 carbons, manufactured by Kao Corporation
1, 2-octanediol: LogP 1.68, 8 carbons, manufactured by FUJIFILM Wako Pure Chemical Corporation
1-octanol: LogP 2.64, 8 carbons, manufactured by FUJIFILM Wako Pure Chemical Corporation
glyceryl caplyrate: LogP 1.64, 11 carbons, SUNSOFT NO. 700P-2-C, manufactured by Taiyo Kagaku Co., Ltd.
Component (D)
An alkyl glucoside: a compound represented by the general formula (D1) in which $R^{1d}$ is an alkyl group with 12 carbons, x is 0, y is 1.35 to 1.45 and G is a residue derived from glucose, MYDOL 12, manufactured by Kao Corporation
C12E03: a compound represented by the general formula (D2) in which $R^{3d}$ is an alkyl group with 12 carbons, s is 3 and t is 0, EMULGEN 103, manufactured by Kao Corporation
C12E06: a compound represented by the general formula (D2) in which $R^{3d}$ is an alkyl group with 12 carbons, s is 6 and t is 0, EMULGEN 108, manufactured by Kao Corporation
C12E012: a compound represented by the general formula (D2) in which $R^{3d}$ is an alkyl group with 12 carbons, s is 12 and t is 0, EMULGEN 120, manufactured by Kao Corporation
C12E023: a compound represented by the general formula (D2) in which $R^{3d}$ is an alkyl group with 12 carbons, s is 23 and t is 0, EMULGEN 123P, manufactured by Kao Corporation
<Disinfecting ability evaluation (1)>
Culturing Conditions
5 μL was extracted from a glycerol stock of *Escherichia coli* NBRC3972 stored at −80° C. in a 10% glycerol, and inoculated into 5 mL of a Soybean Casein Digest (SCD) broth and cultured at 37° C. (with reciprocal shaking) at 200 rpm for 16 hours. 1 mL of the cultured solution was subjected to centrifugation with a centrifugal force of 7,000×g for 5 minutes at a room temperature, and a supernatant was removed and suspended in a saline solution. After this operation was repeated twice, the fungal solution was conditioned with a saline solution such that OD600 was 0.8, and used in the following test.
Conditions for Disinfection Test
Each disinfectant composition was diluted 3 times (v/v) with water at 5° dH (German hardness), and used as a test solution.
20 μL of the fungal solution was inoculated into 2 mL of the test solution or 2 mL of a saline solution used as a control which had been dispensed to test tubes, and the test solution was made into contact with the fungus by reciprocal shaking at 170 rpm at a room temperature. After a predetermined period of time (1 minute) of contact, 100 μL of the test solution was mixed with 900 μL of a Lecithin-Polysorbate (LP) dilution which had been dispensed in advance to a 24-hole plate, thereby inactivating the test solution. The test solution was further diluted with the LP dilution, and 100 μL was smeared on a SCD-LP agar culture medium. After culturing overnight at 37° C., the number of colonies formed on the agar culture medium was counted to calculate the viable bacterial count. The value of the logarithm of the viable bacterial count in the test area subtracted from the logarithm of the viable bacterial count in the control was quantified as a disinfection activity value and shown in Tables 1 and 2.

TABLE 1

| | | | | Example | | | | | | | |
|---|---|---|---|---|---|---|---|---|---|---|---|
| | | | | 1 | 2 | 3 | 4 | 5 | 6 | 7 | 8 |
| Disinfectant composition | Formulation (mass %) | (A) | C16IOS-K C18IOS-K | 3 | 3 | 3 | 3 | 3 | 3 | 3 | 3 |
| | | (A') | ES (3) | | | | | | | | |
| | | (B) | Adipic acid | 0.3 | 0.06 | 0.15 | 0.6 | 1.5 | | | |
| | | | Succinic acid | | | | | | 0.6 | | |
| | | | Azelaic acid | | | | | | | 0.6 | |

TABLE 1-continued

|  |  |  |  |  |  |  |  |  |  |
|---|---|---|---|---|---|---|---|---|---|
|  | Gluconic acid |  |  |  |  |  |  |  |  | 0.6 |
|  | Sorbic acid |  |  |  |  |  |  |  |  |  |
|  | Lactic acid |  |  |  |  |  |  |  |  |  |
| (B') | Hydrochloric acid |  |  |  |  |  |  |  |  |  |
| (D) | Alkyl glucoside | 0.75 | 0.75 | 0.75 | 0.75 | 0.75 | 0.75 | 0.75 | 0.75 |
|  | Ion exchange water | Balance | Balance | Balance | Balance | Balance | Balance | Balance | Balance |
|  | Total | 100 | 100 | 100 | 100 | 100 | 100 | 100 | 100 |
|  |  | 4 | 4 | 4 | 4 | 4 | 4 | 4 | 4 |
| (B)/(A) (mass ratio) |  | 0.1 | 0.02 | 0.05 | 0.2 | 0.5 | 0.2 | 0.2 | 0.2 |
| Evaluation | Disinfecting ability (1) (*E.coli*) | 4.00 | 2.84 | 2.98 | 4.00 | 4.00 | 3.59 | 2.03 | 4.04 |

|  |  |  |  | Example |  |  |  |  | Comparative example |  |  |
|---|---|---|---|---|---|---|---|---|---|---|---|
|  |  |  |  | 9 | 10 | 11 | 12 | 13 | 1 | 2 | 3 |
| Disinfectant composition | Formulation (mass %) | (A) | C16IOS-K | 3 | 3 | 3 |  |  |  | 3 | 3 |
|  |  |  | C18IOS-K |  |  |  | 3 | 3 |  |  |  |
|  |  | (A') | ES (3) |  |  |  |  |  | 3 |  |  |
|  |  | (B) | Adipic acid |  |  | 0.6 | 0.6 |  | 0.3 |  |  |
|  |  |  | Succinic acid |  |  |  |  |  |  |  |  |
|  |  |  | Azelaic acid |  |  |  |  |  |  |  |  |
|  |  |  | Gluconic acid |  |  |  |  |  |  |  |  |
|  |  |  | Sorbic acid | 0.6 |  |  |  |  |  |  |  |
|  |  |  | Lactic acid |  | 0.6 |  |  | 0.6 |  |  |  |
|  |  | (B') | Hydrochloric acid |  |  |  |  |  |  |  | 0.6 |
|  |  | (D) | Alkyl glucoside | 0.75 | 0.75 | 0.75 | 0.75 | 0.75 | 0.75 | 0.75 | 0.75 |
|  |  |  | Ion exchange water | Balance | Balance | Balance | Balance | Balance | Balance | Balance | Balance |
|  |  |  | Total | 100 | 100 | 100 | 100 | 100 | 100 | 100 | 100 |
|  |  |  |  | 4 | 4 | 3 | 3 | 3 | 4 | 4 | 4 |
|  | (B)/(A) (mass ratio) |  |  | 0.2 | 0.2 | 0.2 | 0.2 | 0.2 | — | 0 | 0 |
| Evaluation |  |  | Disinfecting ability (1) (*E.coli*) | 2.75 | 3.61 | 4.33 | 4.33 | 4.33 | 0.57 | 0.13 | 0.06 |

35

TABLE 2

|  |  |  |  | Example |  |  |  |  |  |  |  |  |  |
|---|---|---|---|---|---|---|---|---|---|---|---|---|---|
|  |  |  |  | 14 | 15 | 16 | 17 | 18 | 19 | 20 | 21 | 22 | 23 |
| Disinfectant composition | Formulation (mass %) | (A) | C16IOS-K | 3 | 3 | 3 | 3 | 3 | 3 | 3 | 3 | 3 | 3 |
|  |  | (B) | Adipic acid | 0.6 | 0.6 | 0.6 | 0.6 | 0.6 | 0.6 | 0.6 | 0.6 | 0.6 | 0.6 |
|  |  | (C) | 2-ethylhexyl glyceryl ether |  |  |  |  | 1.5 | 1.5 | 1.5 |  |  |  |
|  |  |  | 1,2-octanediol |  |  |  |  |  |  |  | 1.5 |  |  |
|  |  |  | 1-octanol |  |  |  |  |  |  |  |  | 1.5 |  |
|  |  |  | Glyceryl caprylate |  |  |  |  |  |  |  |  |  | 1.5 |
|  |  | (D) | Alkyl glucoside |  |  |  |  | 0.75 | 0.75 | 0.75 | 0.75 | 0.75 | 0.75 |
|  |  |  | C12EO3 | 0.75 |  |  |  |  |  |  |  |  |  |
|  |  |  | C12EO6 |  | 0.75 |  |  |  |  |  |  |  |  |
|  |  |  | C12EO12 |  |  | 0.75 |  |  |  |  |  |  |  |
|  |  |  | C12EO23 |  |  |  | 0.75 |  |  |  |  |  |  |
|  |  |  | Ion exchange water | Balance | Balance | Balance | Balance | Balance | Balance | Balance | Balance | Balance | Balance |
|  |  |  | Total | 100 | 100 | 100 | 100 | 100 | 100 | 100 | 100 | 100 | 100 |
|  | pH (20° C.) |  |  | 4 | 4 | 4 | 4 | 4 | 4.5 | 5 | 4.5 | 4.5 | 4.5 |
|  | (B)/(A) (mass ratio) |  |  | 0.2 | 0.2 | 0.2 | 0.2 | 0.2 | 0.2 | 0.2 | 0.2 | 0.2 | 0.2 |
| Evaluation |  |  | Disinfecting ability (1) (*E.coli*) | 4.00 | 3.75 | 3.45 | 4.00 | 4.66 | 4.65 | 4.06 | 4.23 | 4.62 | 4.23 |

<Disinfecting Ability Evaluation (2)>

The same test as in the disinfecting ability evaluation (1) was conducted except that each disinfectant composition shown in Table 3 was used as a raw solution without dilution as a test solution, thereby calculating the disinfection activity value. The results are shown in Table 3.

TABLE 3

| | | | | Example | | | | | | |
|---|---|---|---|---|---|---|---|---|---|---|
| | | | | 24 | 25 | 26 | 27 | 28 | 29 | 30 |
| Disinfectant composition | Formulation (mass %) | (A) | C16IOS-K | 1 | 1 | 1 | 1 | 1 | 1 | 1 |
| | | (B) | Adipic acid | 0.1 | | 0.02 | 0.05 | 0.2 | 0.5 | 1 |
| | | | Lactic acid | | 0.1 | | | | | |
| | | (D) | Alkyl glucoside | 0.25 | 0.25 | 0.25 | 0.25 | 0.25 | 0.25 | 0.25 |
| | | | Ion exchange water | Balance | Balance | Balance | Balance | Balance | Balance | Balance |
| | | | Total | 100 | 100 | 100 | 100 | 100 | 100 | 100 |
| | pH (20° C.) | | | 4 | 4 | 4 | 4 | 4 | 4 | 4 |
| | (B)/(A) (mass ratio) | | | 0.1 | 0.1 | 0.02 | 0.05 | 0.2 | 0.5 | 1 |
| Evaluation | | | Disinfecting ability (2) (*E.coli*) | 4.61 | 3.54 | 3.52 | 3.45 | 4.61 | 4.61 | 4.23 |

<Cleaning Ability Test>

A mixture of 100 g of beef tallow, 100 g of soybean oil, 2.5 g of monooleic acid, 1.0 g of Sudan III (manufactured by FUJIFILM Wako Pure Chemical Corporation) and 600 mL of chloroform was used as a model contaminant. A 76 mm×26 mm glass slide (manufactured by Matsunami Glass Ind., Ltd., S2441) was uniformly coated with the prepared model contaminant in a total of 0.04 g on both sides, and used as a model fat-contaminated glass slide. Water whose hardness was conditioned to 5° dH by adding calcium chloride and magnesium chloride to deionized water at proportions of 2:1 by mass ratio was used for cleaning. Each disinfectant composition shown in Table 4 was mixed to 0.7 L of the conditioned water, and used as a treatment liquid. The composition was mixed such that the total concentration of components (A) or (A') and (D) in the treatment liquid was 0.023 mass %. Using a Leenert's tester, 0.7 L of the treatment liquid and 6 model fat-contaminated glass slides (manufactured by Matsunami Glass Ind., Ltd., S2441) were in a 1-liter cleaning test glass beaker and set on the tester. The glass slides were cleaned by stirring at a stirring rate of 250 rpm for 3 minutes in the treatment liquid whose temperature was set to 30° C. The glass slides after cleaning were transferred to a beaker containing 0.7 L of 5° dH water and rinsed at a stirring rate of 250 rpm for 1 minute, and dried at a room temperature. The cleaning rates of the model fat-contaminated glass slides obtained in the above cleaning test were calculated by the following formula. The values in Table 3 are the average values of the cleaning rates of the 6 glass slides.

Cleaning rate (%)= [1-(weight of glass after cleaning-weight of glass before coating with model fat)/(weight of glass after coating with model fat-weight of glass before coating with model fat)] *100

TABLE 4

| | | | | Example 1 | Comparative example 1 |
|---|---|---|---|---|---|
| Disinfectant composition | Formulation (mass %) | (A) | C16IOS-K | 3 | |
| | | (A') | ES (3) | | 3 |

TABLE 4-continued

| | | | | Example 1 | Comparative example 1 |
|---|---|---|---|---|---|
| | | (B) | Adipic acid | 0.3 | 0.3 |
| | | (D) | Alkyl glucoside | 0.75 | 0.75 |
| | | | Ion exchange water | Balance | Balance |
| | | | Total | 100 | 100 |
| | pH (20° C.) | | | 4 | 4 |
| | (B)/(A) (mass ratio) | | | 0.1 | — |
| Evaluation | | | Cleaning rate (%) | 86.6 | 52.8 |
| | | | Disinfecting ability (1) (*E. coli*) | 4.00 | 0.57 |

The invention claimed is:

1. A disinfectant composition, comprising:
an internal olefin sulfonate with 8 or more and 24 or less carbons as a component (A),
one or more organic acids selected from the group consisting of selected from the group consisting of lactic acid, succinic acid, gluconic acid, and adipic acid, as a component (B), and
water,
wherein:
the component (A) comprises an internal olefin sulfonate (IO-1S) with 8 or more and 24 or less carbons in which a sulfonic acid group is present at position 2 or more and 4 or less and an internal olefin sulfonate (IO-2S) with 8 or more and 24 or less carbons in which a sulfonic acid group is present at position 5 or more, and (IO-1S)/(IO-2S), which is a mass ratio of a content of (IO-1S) to a content of (IO-2S) in the component (A), is 0.5 or more and 6.5 or less and wherein (B)/(A), which is a mass ratio of a content of the component (A) and a content of the component (B), is 0.01 or more and 2 or less.

2. The disinfectant composition according to claim 1, further comprising an organic solvent with a LogP of 0.5 or more and 10 or less as a component (C).

3. The disinfectant composition according to claim 1, further comprising a nonionic surfactant as a component (D).

4. A disinfectant composition, consisting essentially of:

an internal olefin sulfonate with 8 or more and 24 or less carbons as a component (A), one or more organic acids selected from the group consisting of lactic acid, succinic acid, gluconic acid, and adipic acid, as a component (B)), optionally an organic solvent with a LogP of 0.5 or more and 10 or less as a component (C), optionally a nonionic surfactant as a component (D), and water, wherein:

the component (A) comprises an internal olefin sulfonate (IO-1S) with 8 or more and 24 or less carbons in which a sulfonic acid group is present at position 2 or more and 4 or less and an internal olefin sulfonate (IO-2S) with 8 or more and 24 or less carbons in which a sulfonic acid group is present at position 5 or more, and (IO-1S)/(IO-2S), which is a mass ratio of a content of (IO-1S) to a content of (IO-2S) in the component (A), is 0.5 or more and 6.5 or less and wherein (B)/(A), which is a mass ratio of a content of the component (A) and a content of the component (B), is 0.01 or more and 2 or less.

5. The disinfectant composition according to claim 1, wherein (B)/(A), which is a mass ratio of a content of the component (A) and a content of the component (B), is 0.05 or more and 1 or less.

6. The disinfectant composition according to claim 1, wherein the component (A) has 16 or more and 18 or less carbons.

7. The disinfectant composition according to claim 3, wherein the component (D) is one or more nonionic surfactants selected from the group consisting of an alkyl glycoside having an alkyl group with 8 or more and 18 or less carbons, an alkyl polyglycoside having an alkyl group with 8 or more and 18 or less carbons, and a polyoxyalkylene alkyl ether having an alkyl group with 8 or more and 18 or less carbons.

8. The disinfectant composition according to claim 1, which has a pH of 7 or less at 20° C.

9. A method for disinfection, the method comprising:

bringing the disinfectant composition according to claim 1 as a raw solution or after dilution with water into contact with a target object containing a fungus.

10. The method according to claim 9, wherein the target object is a hard surface.

11. The method according to claim 9, wherein the fungus is *Escherichia coli*.

12. A method for producing the disinfectant composition according to claim 1, the method comprising mixing:

the component (A);

the component (B); and water.

* * * * *